July 1, 1930.                    E. E. BROWN                    1,769,107
                              FLEXIBLE COUPLING
                              Filed June 13, 1929
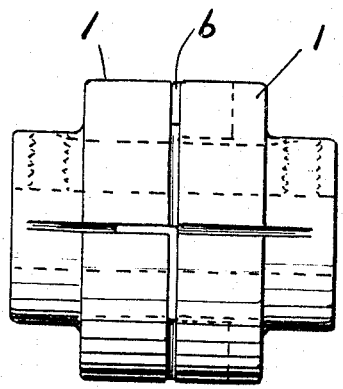
FIG. 1.
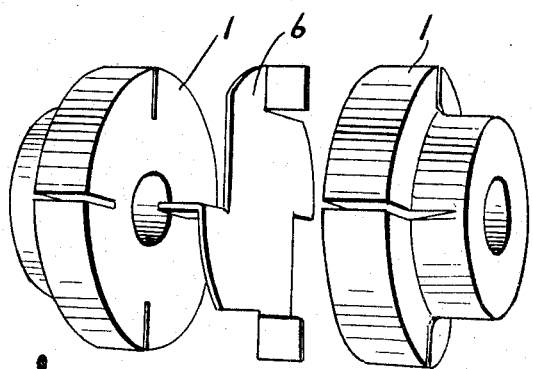
FIG. 2.
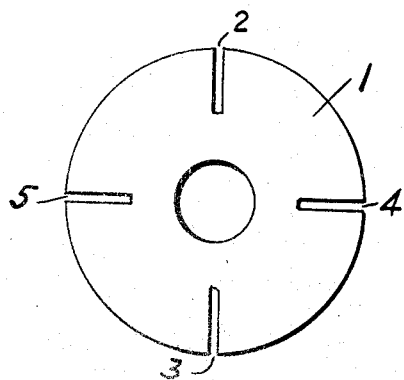     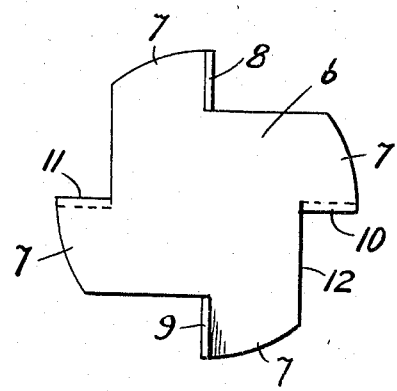
FIG. 3.            FIG. 4.
INVENTOR
Ellis E. Brown
BY
Augustus B. Stoughton
ATTORNEY.
WITNESS:
Robt R Kitchel.

Patented July 1, 1930

1,769,107

UNITED STATES PATENT OFFICE

ELLIS E. BROWN, OF READING, PENNSYLVANIA

FLEXIBLE COUPLING

Application filed June 13, 1929. Serial No. 370,516.

The present invention relates to flexible shaft couplings of the Oldham type and more particularly to improvements in the impeller or driving element of the coupling. One object of the present invention is to provide an efficient yet comparatively light and inexpensive impeller for such couplings.

The invention will be claimed at the end hereof but will be first described in connection with the accompanying drawing forming part hereof and in which Figure 1 is an elevational view of a coupling embodying features of the invention.

Fig. 2 is a perspective view showing the parts of the coupling disassembled.

Fig. 3 is a face view of one of the heads of the coupling, and

Fig. 4 is a similar view of an impeller embodying features of the invention.

In the drawing the heads 1 of the coupling may well be alike so that a description of one will suffice. The face of the head is generally circular in outline and is provided with slots arranged in aligned pairs. It happens that two pairs of slots are shown, and the slots 2 and 3 constitute one pair of aligned slots, and the slots 4 and 5 constitute another pair of aligned slots but the number of pairs of aligned slots is not important nor need the slots be radially disposed as shown because it is quite sufficient if they are parallel to a radial position. The impeller 6 is made of sheet metal and in outline it may well conform to the circular outline of the heads 1, as indicated at 7. The impeller is adapted for insertion between the faces of the heads 1, and it is provided with integral tongues or tangs arranged in aligned pairs and projecting from opposite faces thereof. The tongues or tangs 8 and 9 constitute an aligned pair and project from one face of the impeller, and the tongues or tangs 10 and 11 constitute another pair and project from the opposite face of the impeller. In the present embodiment there happens to be shown four pairs of impellers arranged radially but additional pairs of impellers may be provided and they may be arranged parallel to radial position. The impeller may be made in the form of a sheet metal disk and the disk cut or severed along the lines 12, ranging at right angles to a diameter on which the tangs are struck up or bent into position at right angles to a face on the disk. As shown the ends of the described tongues have been removed but that is not in all cases necessary. The tongues or tangs on one face of the impeller lie in a plane at right angles to the plane in which the tongues or tangs on the other face of the impeller lie.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A flexible coupling comprising heads having slots arranged in aligned pairs disposed right angularly in respect to each other on the respective heads, and a sheet metal impeller adapted for insertion between the faces of the heads and having integral tongues projecting from opposite faces thereof and arranged in aligned pairs disposed right angularly on opposite faces of the impeller.

2. A sheet metal impeller for flexible shaft couplings having outwardly extending integral sheet metal tongues disposed in right angular relation on opposite faces of the impeller and perpendicular to said faces.

ELLIS E. BROWN.